Oct. 4, 1966 W. T. RENTSCHLER 3,276,344
DELAYED-ACTION RELEASE MECHANISM
Filed Dec. 4, 1964 4 Sheets-Sheet 1
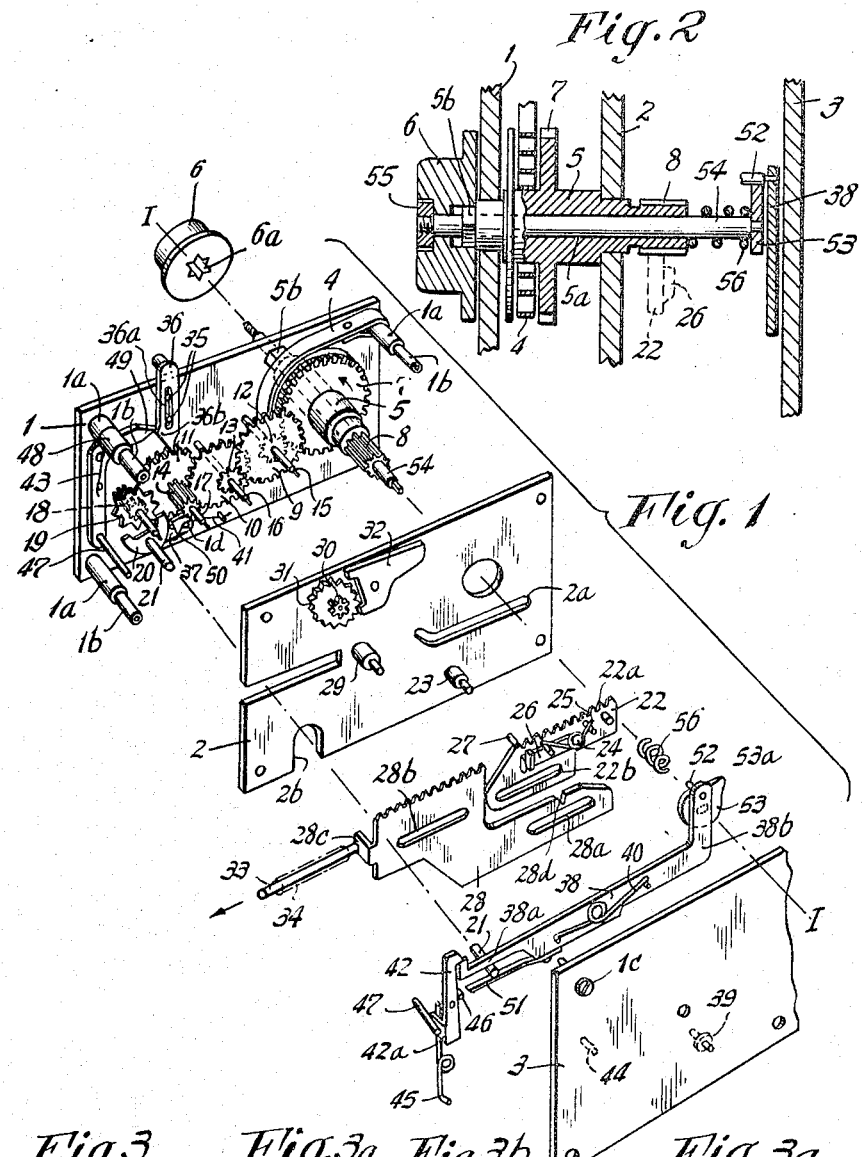
INVENTOR.
Waldemar T. Rentschler
BY
Arthur A. March
ATTORNEY Oct. 4, 1966  W. T. RENTSCHLER  3,276,344
DELAYED-ACTION RELEASE MECHANISM
Filed Dec. 4, 1964  4 Sheets-Sheet 2

INVENTOR.
Waldemar T. Rentschler
BY
Arthur A. March
ATTORNEY

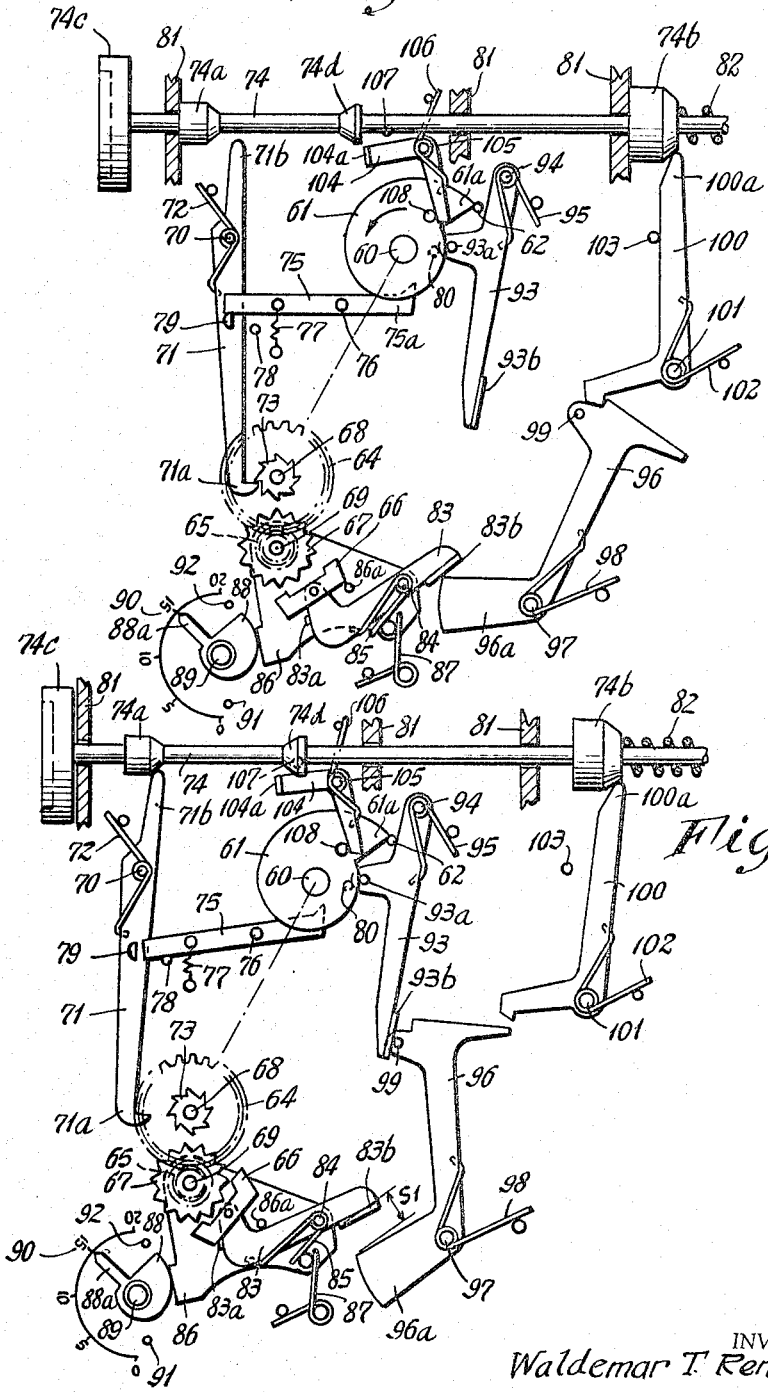

Oct. 4, 1966 W. T. RENTSCHLER 3,276,344
DELAYED-ACTION RELEASE MECHANISM
Filed Dec. 4, 1964 4 Sheets-Sheet 4

INVENTOR.
Waldemar T. Rentschler
BY
Arthur A. March
ATTORNEY

United States Patent Office 3,276,344
Patented Oct. 4, 1966

3,276,344
DELAYED-ACTION RELEASE MECHANISM
Waldemar T. Rentschler, Calmbach, Black Forest, Germany, assignor to Alfred Gauthier, G.m.b.H., Calmbach (Enz), Germany, a corporation of Germany
Filed Dec. 4, 1964, Ser. No. 416,059
Claims priority, application Germany, Dec. 14, 1963, G 39,391
14 Claims. (Cl. 95—53.3)

This invention relates to a delayed-action release mechanism, particularly for use in photographic shutters, having actuating means that follows the same path each time the device is operated in order to actuate a release push-rod.

Delayed-action release mechanisms have been known heretofore of a type operatively connected to a camera by means of a cable release to actuate the camera shutter in the final phase of continuous running-down motion. Such mechanisms permit only a single time delay which is not variable.

Other prior delayed-action release mechanisms built into the shutter of a camera and incorporating one or more gear groups which can be disconnected manually as well as selectively have also been known heretofore. When their gear or mechanism groups are connected together, these delayed-action release mechanisms function in the normal way, while they can be used as delayed-action mechanisms for synchronizing flashbulbs after their groups have been uncoupled.

The present invention has, for one of its main objects, the improvement of a delayed-action release mechanism of the initially mentioned species without any substantial increase in cost, but at the same time capable of operating in a dependable manner and capable of being set for different delay times.

In order to fulfill this object, the present invention comprises a mechanism having one group of components capable of being uncoupled, or one anchor capable of being disconnected. A control device is included which can be manually moved into different setting positions and which comprises an actuating member drivingly connected to a gear member of a portion of the mechanism that cannot be uncoupled. The actuating member uncouples those members that can be uncoupled after a specific, or preset, running time as determined by the setting position of the control device. In this way a variable time delay mechanism is created which preserves the basic concepts of prior mechanisms and which makes it possible, in the best manner, to fulfill the requirements that arise in making exposures which require the use of a delayed action release.

A preferred embodiment of the device which is relatively simple and inexpensive includes a control device that has a cam shaft which is drivingly connected to the running mechanism and which has a disc cam at one end and a set knob at the other end to cooperate with a timing scale so that the cam shaft can be set at different relative positions with respect to the gear member of the mechanism that drives the cam shaft. This arrangement may be made compact by making the cam shaft axially displaceable with respect to a cocking and driving shaft and coaxially located there within. Releasable coupling means must be included to permit the cam shaft to be operated from the driving shaft for setting the mechanism.

Another feature of the invention which improves the operation of the device consists in having the setting knob non-rotatably connected to the cam shaft, with this knob and shaft being releasably coupled to the cocking and driving shaft so that these two shafts can be engaged in different relative positions. By means of this arrangement, the cam disc on the cam shaft cooperates directly or indirectly with the anchor lever of the disconnectable anchor or with the movable carrier of the portion of the mechanism that can be uncoupled from the main driving unit.

In order to insure flexibility of operation with respect to the structure, it is desirable to provide for an adjusting lever for operatively connecting the cam disc arranged on the cam shaft to the anchor lever or to the carrier of that portion of the mechanism that can be uncoupled.

In another embodiment, the control unit includes a cam disc which can be set with respect to a time delay scale and by means of which the anchor lever or a portion of the mechanism that can be uncoupled can be set at different relative positions with respect to the actuating member non-rotatably connected to the driving element of the mechanism.

In order to improve operative connection of the anchor lever or the sub-group that can be uncoupled, the invention further includes an arrangement in which the anchor lever or the sub-group can be arranged on a rotatably positioned plate that engages the cam disc under the pressure of a spring. This arrangement can be further improved by the inclusion of an actuating member in the form of a cam disc non-rotatably connected to the cocking and driving shaft and which, when the mechanism runs down, cooperates either directly or indirectly with the anchor lever or with the carrier of the sub-group that can be uncoupled.

One or more spring-loaded adjusting or setting levers may be provided to connect the cam disc to the anchor lever or to the movable carrier of the sub-group. This causes a certain freedom of choice with respect to the arrangement of the driving and setting members of the device. In order to make certain that the device is always moved into the cocking position when it is supposed to be, an arresting lever can be arranged to block the release push-rod. The arresting lever, upon reaching the prescribed cocking position determined by the fixed stop, may be released by a pin in the mechanism, the pin being moved during the cocking process.

The cocking process may be facilitated by the provision that the adjusting lever or levers can be retained in their end position, which is the position associated with the disconnected or uncoupled state of the anchor or of the sub-group, by means of an arresting lever that can be actuated by the release push-rod.

Details of the invention will become apparent from the following specification, together with the drawings in which:

FIG. 1 is a perspective, exploded view of the apparatus according to the invention;

FIG. 2 is a longitudinal section of the apparatus of FIG. 1 according to the line I—I of FIG. 1;

FIG. 3 is a top view of the cocking and setting knob of the device, showing the position that the knob occupies after the gear members of the device have completed their operation;

FIGS. 3a to 3c show several cocked positions of the cocking and setting knob;

FIG. 6 is another embodiment of the invention shown in cocked position;

FIG. 7 shows the embodiment of FIG. 6 after the release member has been actuated to begin the running-down operation;

Figure 4:
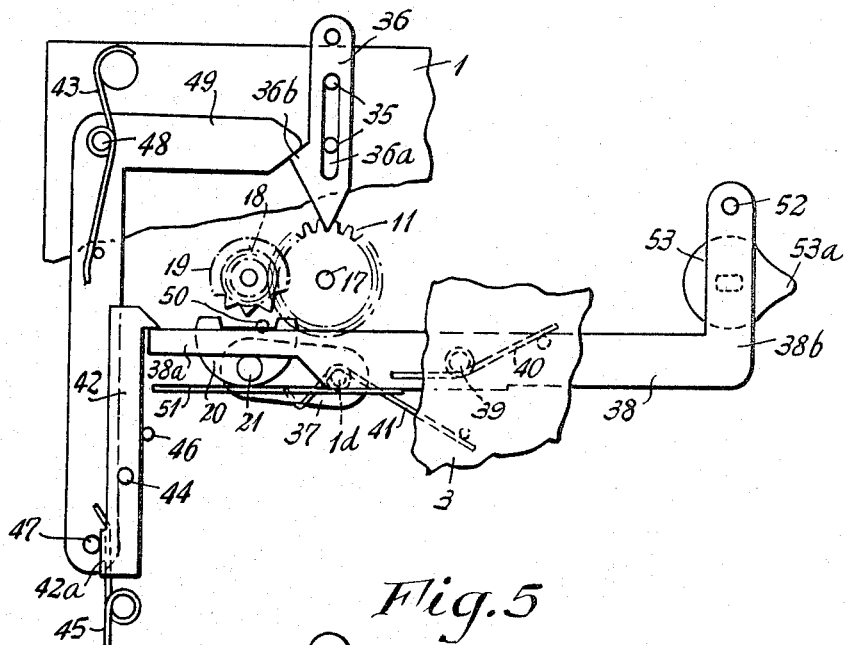
FIG. 4 is an enlarged view of the adjusting lever and associated apparatus in FIG. 1 with the lever in the cocked state, in which the anchor is left off the escapement or ratchet wheel.

In FIGS. 1 and 2 the apparatus includes three bearing plates 1–3 located parallel to its other end, spaced apart by means of several rods 1b. Spacers 1a are placed on the rods which are attached to the bearing plate 1 and the plates 2 and 3 are joined to the rods by several machine screws 1c that engage the threaded ends of the rods 1b. Between the plates 1 and 2 are several gears that form parts of a timing mechanism which has a driving spring 4 attached at one end to one of the rods 1b. The other end of the spring 4 is attached to a cocking and driving shaft 5 which is non-rotatably but releasably connected to a cocking and setting knob 6 accessible from the outside of the apparatus. Two gears 7 and 8 are also non-rotatably connected to the cocking and driving shaft 5. The gear 7 is connected to a mechanism that includes gears 9, 10 and 11 along the pinions 12, 13 and 14 and the bearing pins 15, 16 and 17. The gear 11 meshes with a pinion 18 which is non-rotatably connected to an escapement wheel 19 with which an anchor 21 cooperates.

The gear 8 on the cocking and driving shaft 5 engages a rack 22 which is arranged between the plates 2 and 3 and which is capable of being longitudinally displaced with respect to the plate 2. For this purpose, the rack 22 includes a slot 22b into which a guide pin 23 extends. In addition, a pawl 26 biased by a spring 25 is mounted on a pivot pin 24 of the rack 22 and a pin 27 on the pawl 26 engages a slotted guide 2a in the plate 2. Another rack 28 is also mounted on the plate 2 to be displaced in the same direction as the rack 22 by means of a pin and slot guide comprising the pin 23, the slot 28a, the pin 29, and the slot 28b. In order to obtain a uniform return motion of the rack 28, the rack is associated with a gear 30 that drives an escapement wheel 31 rotatably mounted on the plate 2. An anchor 32 cooperates with the escapement wheel 31. A push-rod 33 is mounted for longitudinal displacement in a fixed guide tube 34 and engages a tab 28c that is bent from the rack 28. The push-rod 33 cooperates with a shutter release (not shown) of a camera in such a way that the release of the shutter takes place during the final part of the running-down motion of the mechanism 5 to 21. In order to cock the mechanism 5–21, the knob 6 must be rotated to cause the gear 7 to rotate in the direction of the arrow in FIG. 1 until it strikes an end stop which is not illustrated in this drawing. During the cocking process, the driving spring 4 is placed under increased tension and the rack 22 is moved by the gear 8 toward the right from the position shown in FIG. 1. Near the end of the cocking motion, the pawl 26 rotatably mounted on the rack 22 engages a notch 28d in the rack 28 under pressure from the spring 25. The mechanism 5–21 is held in its cocked position by a release slide 36 pushed in a guide comprising pins 35 and a slot 36a. The pins 35 are attached to the plate 1 and the slide 36 has a pointed end that engages the teeth on the gear 11. If necessary, a uni-directional coupling, such as a ratchet or friction coupling, may be provided between the cocking and driving shaft 5 and the gears of the mechanism 5–21. In this case, the gear 11 remains in position during the cocking process.

In order to start the operation of the mechanism 5–21, the release slide 36 must be lifted to disengage it from the gear 11. By connection to the train of gears, this permits the gear 8 to begin rotating and this, in turn, displaces the two racks 22 and 28 which are coupled together by the pawl 26. Movement of the rack 28 to the left pushes the rod 33 to the left at the same time and the motion of this rod together with the racks 22 and 28 is such that the camera shutter is actuated near the end of the leftward movement of these members, which occurs near the end of the running-down motion of the mechanism 5–21. Immediately thereafter, the pawl 26 is lifted out of the notch 28d because the pawl is tilted upward by engagement of the pin 27 with the slot 2a. This permits the rack 28 to return to the starting position shown in FIG. 1 under the control of a restoring spring (not shown). When the cocking and setting knob 6 is actuated again, the pawl 26 again engages the notch 28d.

In order to permit different delay times to be set, at least one element of the group of mechanism 5–21 must be uncoupled so as to eliminate the drag of the anchor 20 on its escapement wheel 19. The element to be uncoupled can be the anchor 20 itself or some sub-group within the mechanism 5–21. The duration of the delay is determined primarily by the length of time that it takes for the mechanism 5–21 to run down to the point at which the element is disengaged. At that instant the rotation of the gear 8 speeds up considerably and in a very short time the leftward movement of the push rod 33 is completed and the shutter is actuated. One of the advantages of this type of operation is that the movement of the push rod 33 becomes rapid just before the camera shutter is actuated, when makes the operation of the shutter more positive.

In the embodiment according to FIGS. 1–4, this is accomplished by having the pivot pin 21 of the anchor 20 mounted on a lever 37 which is pivotally mounted on a pin 1d on the plate 1. The pivot pin 21 extends through an opening 2b in the plate 2 and into the path of motion of a two-armed adjusting lever 38. The latter is pivotally mounted on a pin 39 on the plate 3 and is biased by a spring 40 to cause it to try to rotate clockwise. The arm 38a of the adjusting lever 38 lifts the anchor 20 off the escapement wheel 19 at a time determined by the cocking and setting knob 6. The anchor 20 is maintained in its disengaged, or lifted-off, position in spite of the force of a spring 41 that bears against the lever 37. As is especially apparent in FIG. 4, a pawl 42 engages the arm 38a and holds the adjusting lever 38 in position when the anchor 20 is swung out. The pawl 42 is pivotally mounted on a pin 44 on the plate 3 so that when it is in its locking, or arresting, position it is forced by a spring 45 against a fixed pin 46. A flange 42a bent off from the pawl 42 rests against a pin 47 on a lever 49 pivotally mounted on a pin 48 attached to the plate 1. This lever 49 cooperates with a projection 36b extending from the release slide 36 so that when the release slide is lifted, the lever 49 is rotated counterclockwise under the force of a spring 43. The pin 47 forces the pawl 42 to become disengaged from the lever 38 so that the latter can rotate clockwise. This moves the arm 38a away from the pin 21 and permits the anchor 20 to engage the escapement wheel 19 to control the rotation thereof. A resilient blade 51 attached to the lever 38 engages the pin 21 to hold the anchor 20 in operative position.

Figure 5:
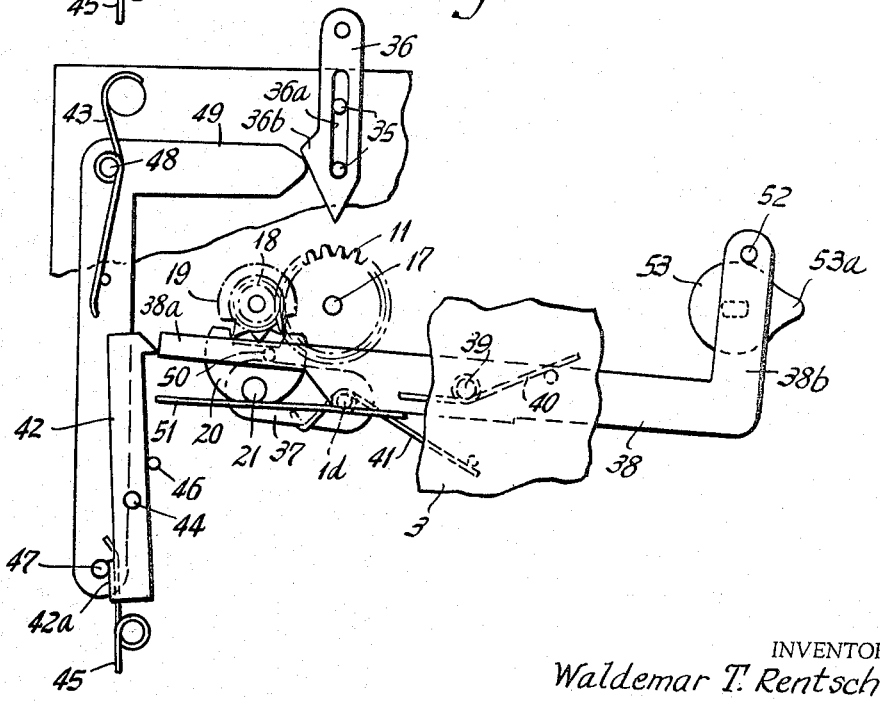
FIG. 5 shows the same apparatus as FIG. 4, but during the running-down motion thereof and with the anchor engaged with its escapement wheel.
Figure 8:
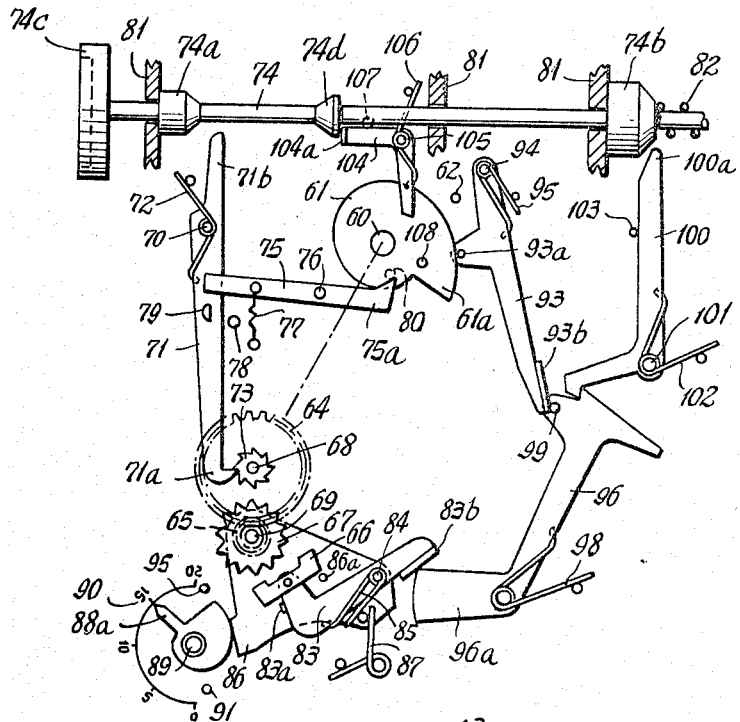
FIG. 8 shows the apparatus of FIG. 6 after the mechanism has run down.
Figure 9:
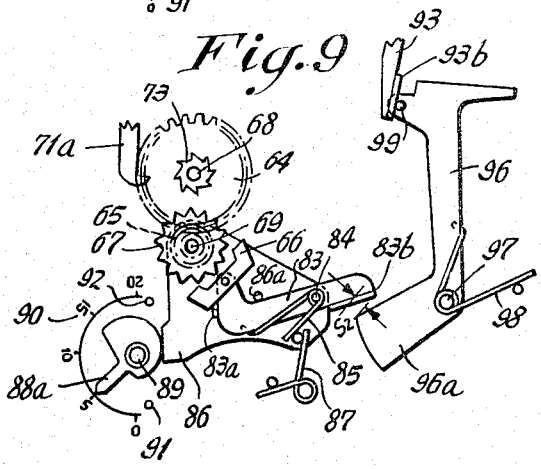
FIG. 9 shows part of the apparatus of FIGS. 6-8 with the device set for a shorter running-down time.

As is further apparent from FIGS. 1, 4 and 5, the arm 38b of the lever 38 has a pin 52 that engages a cam disc 53 which is non-rotatably attached to the free end of a cam shaft 54. This cam shaft is rotatably mounted in a coaxial bore 5a within the cocking and driving shaft 5 and, in addition, the cam shaft 54 is axially movable with respect to the shaft 5. At the outer end, the cocking and setting knob 6 is attached to the cam shaft 54 by means of a nut 55. The knob 6 has a star-shaped cavity 6a which engages a square section on the shaft 5. A coil spring 56 is also mounted on the cam shaft 54 to press against the gear 8 and the cam disc 53 in order to urge the knob 6 into engagement with the square section on the shaft 5 in the position illustrated in FIG. 2. However, the knob 6 can be disconnected from the shaft 5 by simply pulling the knob far enough out to allow the square section of the shaft 5 to slip out of the recess 6a. When this has been done, the knob 6 along with the cam shaft 54 and the cam disc 53 can be moved freely to be set at different relative positions with respect to the shaft 5 which is maintained in its starting position.

Supplementing the above-described arrangement, the invention includes a scale 57 on which several numerical values are indicated. A mark 6b on the knob 6 can be set opposite any of these values which, in the drawing, include "8," "12," "16" of the scale 57. These are normally seconds and represent the amount of delay for which the apparatus may be set. At the expiration of the delay, some portion of the mechanism 5–21 is released by sudden, final movement.

If the knob 6 is rotated from the starting position shown in FIG. 3 in the direction of the arrow, the driving spring 4 will be placed under increased tension. During this motion, the anchor 20 is removed from engagement with the escapement wheel 19. When the mechanism 5–21 is cocked, the knob 6 may be set to any of the positions shown on the scale 57. For example, according to FIG. 3a the knob 6 has been set at the numerical value "16," indicating that the shutter will be actuated 16 seconds after operation of the mechanism 5–21 has been started. Shorter delay periods, such as 12 seconds or 8 seconds may also be obtained by simply disconnecting the connection between the shaft 5 and the knob 6 by axially moving the knob. The knob can then be turned to bring its setting mark 6b opposite the desired delay time on the scale 27. Thereafter the knob 6 must be released and the spring 56 will then force it back into the position illustrated in FIG. 2. In this position, the knob and the shaft 5 are non-rotatably connected to each other.

If the release slide is lifted in order to release the mechanism 5–21, the projection 36b will rotate the lever 49, as stated hereinabove, causing the pin 47 to remove the pawl 42 from the lever 38 and permit the latter to rotate until the pin 52 strikes the cam disc 53. This process causes the arm 38a to release the anchor 20 and permit it to engage the escapement wheel 19 so as to control the running down of the mechanism 5–21.

When the mechanism 5–21 starts to run down, the anchor 20 exerts a braking effect on the shaft 5. The knob 6 and the cam disc 53 also rotate with the shaft 5 in the direction of the arrow in FIG. 3a until eventually the control cam 53a of the cam disc 53 strikes the pin 52. This causes the adjusting lever 38 to rotate counterclockwise which, in turn, causes the arm 38a to move the anchor 20 away from the escapement wheel 19 and into the inoperative position illustrated in FIG. 4. The adjusting lever 38 is caught in this position by the pawl 42. The mechanism 5–21 is thereupon freed to continue its running-down motion, but at a greatly increased speed so that it reaches the end of its path within a few milliseconds, a time much shorter than the delay prior to the release of the escapement wheel 19. It is to be noted that instead of separating the anchor 20 from the wheel 19, two other elements of the mechanism 5–21 could be separated from each other to permit the shaft 5 to increase its rotational speed suddenly.

FIGS. 3a, 3b and 3c show the respective angular ranges $a_1$, $a_2$, and $a_3$ of the control cam 53a corresponding to different setting positions of the knob 6. As is evident in FIG. 3a, if the knob 6 is set for a 16-second delay, the control cam 53a must travel through a substantially greater angle of rotation than when the knob is set for a 12-second or a 8-second delay, as shown in FIGS. 3b and 3c, respectively.

The embodiment shown in FIGS. 6–9 also includes a cocking and driving shaft 60. A cam disc 61, which may have the shape of an Archimedes spiral, is non-rotatably connected to the shaft 60. The gear 64 is connected to the shaft 60 by means of a gear chain, shown in the illustration as a dash-dot line. The gear 64 meshes with a pinion 65 to which an escapement wheel 67 is attached. This wheel cooperates with an anchor 66. The gear 64 is rotatably mounted on a pin 68, while the pinion 65 and the escapement wheel 67 are rotatably mounted on a pin 69.

In order to keep the mechanism in the cocked position shown in FIG. 6, the invention includes an arresting pawl 71 rotatably mounted on a fixed pin 70 and provided with an end 71a bent into the shape of a hook to engage the teeth of a ratchet gear 73 and to be held in contact therewith by a spring 72. The ratchet gear 73 is non-rotatably connected to the gear 64 and its teeth are selected so that the end 71a of the arresting pawl 71 slides freely over the teeth during the cocking process, but engages the teeth to prevent rotation of the gear 64 in the running-down direction. The pawl 71 has an arm 71b in the path of motion of a collar, or flange, 74a on delayed action release rod 74. In this arrangement, when the rod 74 is depressed, the pawl 71 is disengaged from the ratchet gear 73.

The pawl 71 is prevented from returning to the arresting position too soon by locking lever 75 that holds the pawl 71 in its inoperative position even after the push-rod 74 has been released. The locking lever 75 is mounted on a pivot pin 76 and has a spring 77 that tends to urge it into contact with a fixed pin 78. When the locking lever 75 is released, it moves in front of a pin 79 on the pawl 71. The arm 75a of this locking lever then extends into the path of motion of a pin 80 on the cam disc 61. For this purpose, the pin on the cam disc is arranged so that it strikes the arm 75a at the end of the running-down motion of the mechanism, thereby pivoting the lever 75 out of the way of the pin 79. This permits the pawl 71 to return, in response to the spring 72, to the arresting position shown in FIGS. 6 and 8.

In the embodiment of FIGS. 6–9, the push-rod 74 is mounted for longitudinal motion in fixed guides 81. In addition, the push-rod is acted upon by a compression spring 82 which bears against the collar 74b to urge the rod 74 into the starting position shown in FIGS. 6 and 8. In addition, the push-rod 74 has a finger piece 74c accessible from the outside. The anchor 66 is mounted on a lever 83 that includes a stop 83a which limits the movement of the anchor. The lever 83 is pivotally mounted on a pin 84, and a spring 85 urges the lever 83 toward the position illustrated in FIG. 7, in which the anchor rests against a stop pin 86a and is in engagement with the escapement wheel 67. Both the pin 84 and the stop pin 86a are mounted on a triangular plate 86 pivotally mounted on a pin 69 which also serves as an axle for the escapement wheel 67. A spring 87 urges the plate 86 clockwise to keep it engaged with a cam disc 88. The latter may also have the shape of an Archimedes spiral just like the cam disc 61. The disc 88 is non-rotatably mounted on a shaft 89 which has a setting knob (not shown in the drawing) and a pointer 88a. The latter indicates the setting of the time delay on a fixed setting scale 90. Two stop pins 91 and 92 are positioned close to the limits "0" and "20" of the delay scale to prevent the pointer 88a from moving beyond this range.

The cam disc 61 is non-rotatably connected to the shaft 60 and is designed to actuate a lever 93 pivotally mounted on a pin 94 and urged clockwise by a spring 95. Because of the force of the spring, a pin 93a of the lever 93 engages the circumference of the cam disc 61. The lever 93 cooperates with an adjusting lever 96 pivotally mounted on a pin 97 and urged in the counterclockwise direction by a spring 98. A pin 99 extending from the lever 96 engages a flange 93b of the lever 93. In addition to the pin 99, the lever 96 includes an arm 96a and a flange 83b bent off from the lever 83 extends into the path of motion of the arm 96a. The invention also provides for an arresting lever 100 controlled by the release 74. The lever 100 serves the purpose or arresting the lever 96 in the end position illustrated in FIG. 6 in which the anchor 66 is disconnected from the escapement wheel 67. The lever 100 is mounted on a pivot pin 101 and a spring 102 presses the lever 100 against a fixed pin 103 in the arresting position. The arm 100a of the arresting lever 100 extends into the path of motion of the collar, or flange, 74b which rotates the lever clockwise when the push-rod is depressed to initiate operation of the mechanism by releasing the adjusting lever 96.

In order to ensure that the mechanism is completely cocked each time, which is the case when the projection 61a of the cam disc 61 strikes the fixed pin 62, an arresting lever 104 is mounted adjacent to the push-rod 74 to prevent displacement of the release push-rod 74 as long as the cam disc 61 has not reached the end position. The arresting lever 104 is mounted on a fixed pin 105 and is engaged by a spring 106, which presses the lever 104 toward a fixed pin 107. In this position, a bent-off lug 104a of the arresting lever 104 is located in front of a collar 74d of the release push-rod 74, thereby preventing the displacement of the latter. The arresting lever 104 is released by a pin 108 located on the cam disc 61 in such a position that, at the end of the cocking process and immediately before the projection 61a of the cam disc 61 impinges on the stop pin 62, the pin 108 pivots the arresting lever 104 counterclockwise to move the lug 104a out of the path of the collar 74d.

The handling and method of working of the above-described arrangement, as illustrated in FIGS. 6–9, are as follows:

By rotating the cocking and driving shaft 60, the mechanism can be cocked as illustrated in FIG. 6, thus bringing the projection 61a of the cam disc 61 against the fixed stop pin 62. Toward the end of the cocking operation, the pin 108 on the cam disc 61 moves the arresting lever 104 out of its arresting or locking position so that the release push-rod 74 can be displaced. The other members of the device, especially the arresting pawl 71 and the levers 83, 96 and 100, as well as the plate 86, maintain the position they originally occupied.

It the mechanism is now released, which can be done by actuating the release push-rod 74, the flange 74b will first disconnect the arresting lever 100 from the adjusting lever 96. The adjusting lever 96 then pivots, which causes the pin 99 to strike the bent-off lug 93b of the lever 93. The anchor lever 83 is forced by the spring 85 to follow this motion of the adjusting lever 96 until the lever 83 strikes the pin 86a. This brings the anchor 66 into engagement with the escapement wheel 67 of the mechanism. The anchor lever 83 and the adjusting lever 96 thereby move into the relative position illustrated in FIG. 7, spaced apart by a distance "$S_1$."

If the release push-rod 74 is depressed still further, the collar 74a lifts the arresting pawl 71 off the ratchet gear 73. While the mechanism is set in motion instantaneously, the arresting lever 75 is placed in front of the pin 79 of the arresting pawl 71 and thereby prevents this pawl from returning to the arresting position. After the mechanism has run down, the cam disc 61 moves the lever 93 counterclockwise, thereby causing the adjusting lever 96, which is pressed against the lug 93b, to pivot clockwise. During this process, the arm 96a of the adjusting lever gradually approaches, and finally strikes, the lug 83b of the anchor lever 83 after having moved the distance "$S_1$." This causes the anchor lever 83 to take part in the motion and, in so doing, to pivot counterclockwise with the result that the anchor 66 is disengaged from the escapement wheel 67. While the adjusting lever 96 now reaches a position in which it is caught by the arresting lever 100, the mechanism travels the remaining running-down path in a much shorter time, because of the absence of the delaying action of the anchor, and thereupon releases the camera shutter. In the same manner as described in the embodiment according to FIGS. 1–5, the release in the above-described arrangement may also be effected by means of a rack and push-rod arrangement driven by the cocking and driving shaft 60.

If a shorter delayed-action time of, for example, 5 seconds is set in the embodiment according to FIGS. 6–9, the effective distance of the ends of the levers 83 and 96, which ends face each other, is reduced to "$S_2$." This means, in turn, that counting from the start of the running-down motion of the mechanism, the lever 96 engages the anchor lever 83 earlier, thereby removing the anchor 66 from engagement with the escapement wheel after a shorter delay time.

What is claimed is:

1. A delayed-action release mechanism for photographic shutters, said mechanism comprising: an actuator connectable to a shutter release; a driving spring; first means drivingly connecting said spring to said actuator to operate said actuator from said spring; a first gear connected to said spring to be driven thereby; a driven shaft; second means for limiting the initial speed of said first means, said second means comprising at least one element connected between said gear and said driven shaft to transmit force from said spring to said shaft and capable of being uncoupled; and a control device arranged to be manually conveyed into different setting positions and comprising an actuating member drivingly connected to said spring and connected to said element to uncouple the same after a specific running down in response to the respective setting position of said control device, to permit said spring to drive said actuator faster when said element becomes uncoupled.

2. The delayed-action release mechanism according to claim 1 in which said control device comprises a camshaft rotatably drivingly connected to said spring; a cam disc at one end of said camshaft; a setting knob at the other end of said camshaft; a running-time scale adjacent to said knob by means of which said camshaft can be set at different relative positions with respect to said first gear.

3. The delayed-action release mechanism according to claim 2, comprising a cocking and driving shaft connected to said spring to stress said spring and having a coaxial bore, said camshaft being rotatably mounted in said bore and axially movable with respect to said cocking and driving shaft to be releasably coupled thereto.

4. The delayed-action release mechanism according to claim 3 in which said setting knob is non-rotatably connected to said camshaft and said knob and said camshaft can be coupled to said driving shaft in different relative positions.

5. A delayed-action release mechanism, for photographic shutters, comprising: an actuator connectable to a shutter release; a driving spring; a first gear connected to said spring to be driven thereby; first means drivingly connecting said first gear to said actuator to operate said actuator from said spring; a driven shaft; second means for limiting the initial rotational speed gear, said second means comprising at least one element connected between said gear and said driven shaft to control transmission of force from said spring to said shaft and capable of being uncoupled; and a control device arranged to be manually conveyed into different setting positions and comprising a camshaft rotatably, drivingly connected to said spring, a cam disc on said camshaft and a setting knob connected to said camshaft to set said camshaft to different relative positions with respect to said driven shaft, said cam disc cooperating with said one element, to permit said spring to drive said actuator faster when said element becomes uncoupled.

6. The delayed-action release mechanism according to claim 5 in which said element comprises an anchor lever and an escapement wheel to control the running-down speed of said first gear.

7. The delayed-action release mechanism according to claim 5 comprising, in addition, an adjusting lever for operatively connecting said cam disc to said element.

8. The delayed-action release mechanism according to claim 5 comprising, in addition, a running-time scale for indicating the amount of delay, said cam disc being settable with respect to said scale, and in which said element can be set at different relative positions with respect to said driven shaft.

9. The delayed-action release mechanism according to claim 8 comprising, in addition, a rotatably mounted plate; and resilient means forcing said plate to engage said cam disc, and said element is mounted on said plate.

10. A delayed-action release mechanism, for photographic shutters, comprising: a driving spring, a cocking and driving shaft connected to said spring to apply tension to said spring; a first cam disc non-rotatably connected to said cocking and driving shaft; a gear train connected to said cocking and driving shaft; an escapement wheel connected to said gear train; an anchor operatively engageable with said escapement wheel; an anchor lever supporting said anchor; a release member; means connected to said release member to be operated thereby to control the position of said anchor lever whereby said anchor lever is pivoted to remove said anchor from engagement with said escapement wheel at a predetermined time after the beginning of operation of said escapement wheel; a plate holding said anchor lever; and a second cam disc engaging said plate to control the position thereof to set the time at which said anchor will be disengaged from said escapement wheel after the beginning of operation of said escapement wheel.

11. The delayed-action release mechanism according to claim 10 in which said means connecting said release member to said anchor lever comprises at least one adjusting lever and a spring connected to said adjusting lever to bias the same into contact with said release member.

12. The delayed-action release mechanism according to claim 11 comprising, in addition, an arresting lever to engage said release member to lock said release member in its start position; a pin on said first cam disc to engage said arresting lever when said mechanism is cocked, whereby said arresting lever pivots away from said release member to permit said release member to be depressed to release the adjusting lever.

13. The delayed-action release mechanism of claim 12 in which said means connected to said release member comprises a first setting lever and a second adjusting lever, said mechanism comprising, in addition, a second arresting lever engaging said release member to control the operation of said adjusting levers to retain said adjusting levers in their end positions corresponding to the disengagement of said anchor from said escapement wheel.

14. A delayed-action release mechanism, for photographic shutters, comprising: a driving spring; a gear train connected to said spring to be driven thereby; an escapement wheel connected to said gear train to be driven thereby; an anchor engageable with said escapement wheel to control the rotational speed thereof; means supporting said anchor to uncouple said anchor from said escapement wheel; a cocking and driving shaft connected to said spring to be driven thereby and to cock said spring; a cam disc driven by said cocking and driving shaft; a lever engaging said disc to be actuated thereby; means connected to said lever to disengage said anchor from said escapement wheel at a predetermined time after the initiation of operation thereof; means connected to said cocking and driving shaft to be driven thereby to be moved relatively suddenly when said anchor is removed from engagement with said escapement wheel, whereby the final movement of said means is relatively rapid, said means being connectible to a shutter to actuate said shutter with a relatively sharp impact.

References Cited by the Examiner
UNITED STATES PATENTS

| | | | |
|---|---|---|---|
| 1,543,741 | 6/1925 | Anderson | 95—53.6 |
| 3,154,951 | 11/1964 | Vuillumier | 95—53.6 |

JOHN M. HORAN, *Primary Examiner.*